Feb. 27, 1940.  G. H. HUNT  2,191,716
BRAKING MECHANISM
Filed Nov. 9, 1936   2 Sheets-Sheet 1
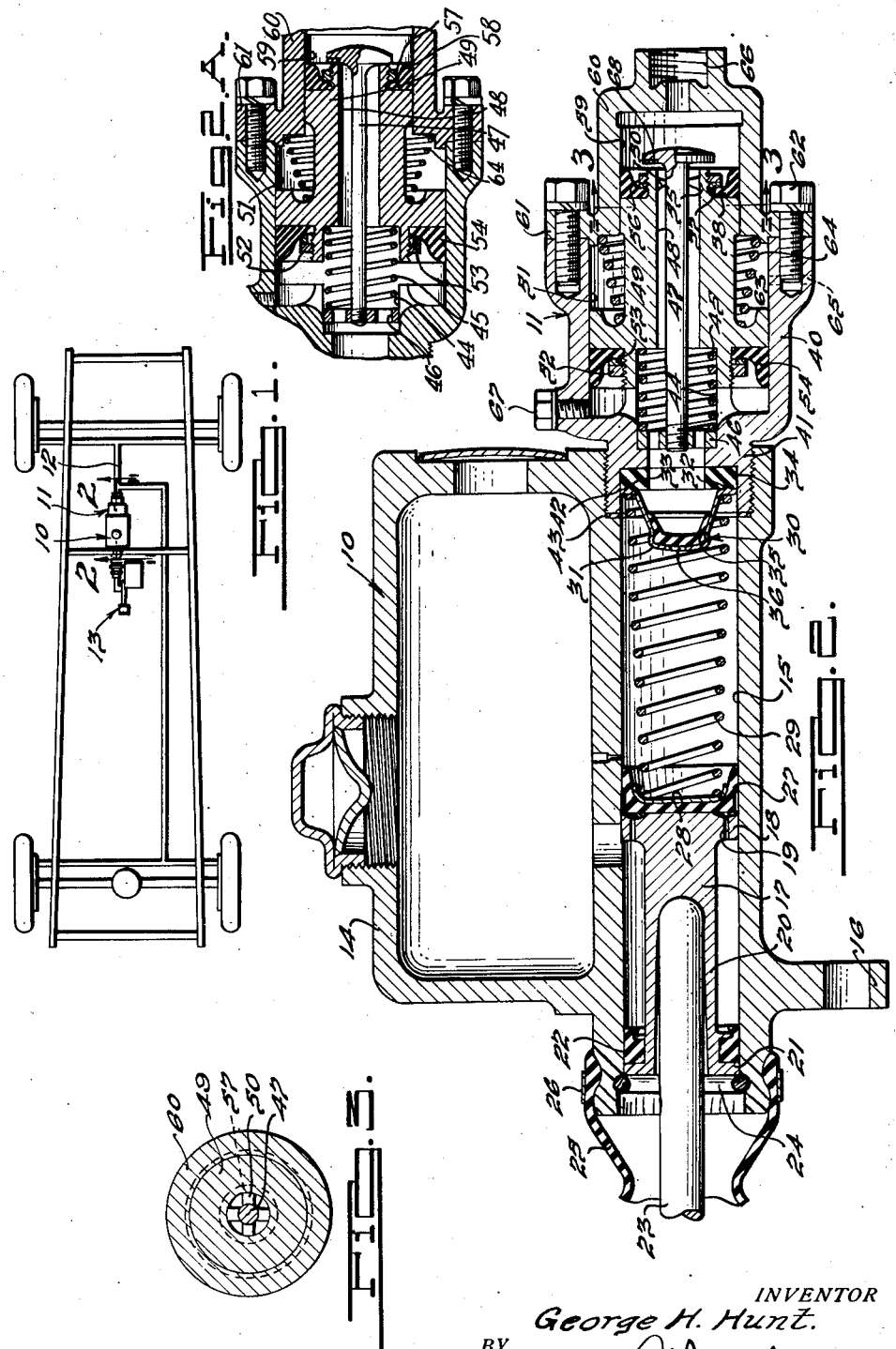
INVENTOR
George H. Hunt.
BY
ATTORNEY Feb. 27, 1940. G. H. HUNT 2,191,716
BRAKING MECHANISM
Filed Nov. 9, 1936 2 Sheets-Sheet 2
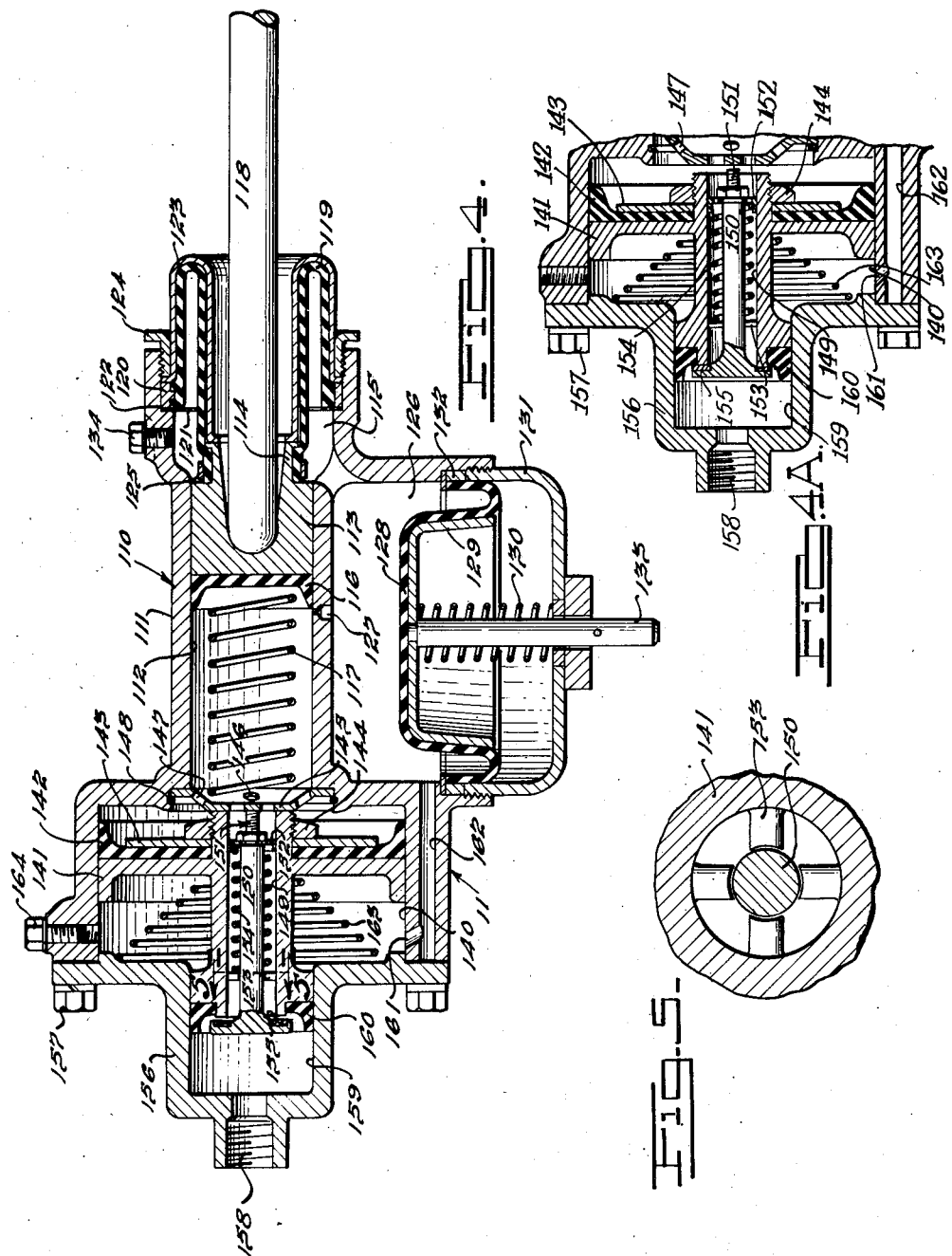
INVENTOR
George H. Hunt.
BY
ATTORNEY Patented Feb. 27, 1940

2,191,716

UNITED STATES PATENT OFFICE 2,191,716

BRAKING MECHANISM

George H. Hunt, Detroit, Mich., assignor to Borg-Warner Corporation, a corporation of Illinois Application November 9, 1936, Serial No. 109,876

3 Claims. (Cl. 60—54.6)

This application relates to hydraulic braking systems and particularly to improvements in the construction of parts thereof, such as the master cylinder and an hydraulic booster to be used in conjunction therewith.

A principal object of the invention is to provide a new and improved form of hydraulic booster to be used in conjunction with the master cylinder and constructed for hydraulic braking systems, and which booster and cylinder constructions are particularly adapted for use in hydraulic braking systems of the open type, but which may be used in the closed type if so desired.

Another object of the invention is to provide an hydraulic booster and a compressor-reservoir in combination, such combination being directly interposed between the external accentuating means for applying pressure to the braking system and the braking system itself, and which is adapted to create a high pressure in the system upon the application of a low pressure by the operator.

Another object of the invention is to provide an hydraulic booster in combination with a braking fluid reservoir and comprising a piston of unequal cross-sectional areas, such piston being spring-impressed, and the inequality of the cross-sectional areas thereof together with a valve associated with said piston being accountable for a quick take-up of the operator's efforts applied thereto and transmission thereof to the braking means.

Another object of the invention is to provide an improved form of hydraulic booster construction which is particularly adapted for use with any ordinary master cylinder and to be manufactured in quantities and at a reasonable cost, which is more efficient in operation, which is more durable, which necessitates the exercise of a minimum amount of effort on the part of the operator, and which is not subject easily to get out of efficient working condition.

Another object of the invention is to provide in an open braking system, an hydraulic booster associated with a master cylinder which has therein a fluid reservoir, said reservoir being provided to store a surplus amount of fluid and being adapted to transmit said fluid through the booster associated therewith and the fluid line associated with the braking system, the obvious purpose for supplying such reservoir being to do away with the continuous additions of fluid to the system on the part of the operator, and the purpose for supplying such booster being to furnish a quick take-up of the operator's efforts applied to the brake pedal and transmit same to the braking means.

Another object of the invention is to provide a novel form of hydraulic booster which is adapted to be used in conjunction with a large portion of the braking systems now on the market, and which is disposed in direct fluid pressure communication with and connected between the master cylinder and the braking elements, such connection being made with and into the ordinary type of master cylinder.

Another object of the invention is to directly associate an hydraulic booster with the fluid within a compressor type of reservoir and the foot pedal operating means, the entire system being provided with means for creating and maintaining an intimate relationship between the parts of the mechanism and the fluid therewithin.

Another object of the invention is to provide a novel combination of a master cylinder construction and an hydraulic booster construction which operates to give a high wheel-braking efficiency with a low pedal pressure, which requires a less than ordinary number of brake adjustments per unit of time, which could be constructed, if so desired, so as to make possible the complete wearing-out of the brake linings without having made any previous brake-shoe adjustments, which may be used on extra heavy-duty vehicles to replace the present vacuum power utilization, and which allows a brake lining of less than ordinary coefficient of friction (which necessarily renders greater stability to the braking system) to be used in the wheel brakes.

Other objects and advantages of the invention will appear from a reference to the following specification taken in conjunction with the accompanying drawings of which there are two sheets, and wherein:

Fig. 1 is a more or less diagrammatic view of a braking system as applied to the chassis of a vehicle;

Fig. 2 is a view partially in elevation and partially in section of the master cylinder and hydraulic booster associated therewith which illustrates a preferred form of the invention and is taken on a plane along the lines 2—2 of Fig. 1;

Fig. 2A is a view similar to Fig. 2 but showing the booster in brake applying position.

Fig. 3 is a cross-sectional view taken on a plane along the lines 3—3 in Fig. 2 and illustrating the form of valve guide used in the booster embodied in this invention;

Fig. 4 is a view partially in elevation and partially in section of the hydraulic booster used in conjunction with the closed type of hydraulic system and illustrating a modified form of the construction appearing in Fig. 2; and Fig. 4A is a view similar to Fig. 4 but showing the booster in brake applying position.

Fig. 5 is a cross-sectional view taken on a plane along the lines 5—5 in Fig. 4 and illustrating the type of valve guide used in the modified construction appearing in Fig. 4.

The theory behind the object of supplying an hydraulic booster in the fluid line and between the point of pedal pressure application and the point of brake pressure application is to provide a means wherein the pedal pressure can be built-up until a predetermined difference in pressure arises in the booster on either side of the piston provided therein. To serve this purpose, the effective cross-sectional area of the end face of the booster piston which is acted upon by the pedal pressure is made considerably, but reasonably, greater than that of the opposite end face thereof. The piston itself is telescoped by a spring which is so arranged with respect thereto, and having a sufficient strength, that the piston is not allowed to move until the fluid pressure in the lines leading to the wheel brakes has risen to a point at or beyond which the brake shoes are forced into their respective drums. When these conditions have been met with, the booster piston "floats", and any small additional pressure which is applied to the foot pedal (or any other accentuating means) simultaneously seats a valve which is reciprocably mounted within a bore in said piston upon said piston and acts against the forward and larger face of the piston and is transmitted through the piston to its opposite and smaller face and has an immediate and increasing effect upon the fluid pressure in the line which is inversely proportional to the areas of the piston faces. Such a booster, obviously, requires a minimum effort on the part of the operator to obtain a braking action which is not only maximum but immediate.

Fig. 1 discloses a diagrammatic view of a chassis of an automotive vehicle and illustrates the application thereto of an hydraulic braking system including a master cylinder, generally indicated at 10, suitably secured to one of the frame cross-members of the chassis and having operatively associated therewith an hydraulic booster, generally indicated at 11. This figure also discloses fluid supply lines 12 for transmitting pressure from the master cylinder 10 through booster 11 and to and through said supply lines to the wheel brakes, and means, generally indicated at 13, for operating the braking system, such as a conventional foot pedal which is adapted to be engaged by the foot of the vehicle operator for operating this system.

The master cylinder 10, in Fig. 2, comprises a part of an open fluid system for operating the individual wheel brakes, and is adapted to have used in conjunction therewith the hydraulic booster 11. It will be seen that there is direct communication between the pedal operation, the master cylinder, the hydraulic booster, and the fluid lines leading to the braking wheels.

The master cylinder construction illustrated in Fig. 2 comprises a body casting 14 formed internally thereof to provide a cylinder bore 15, the casting being provided with suitable means, such as a flange 16, whereby the same may be suitably secured to the chassis of an automotive vehicle.

Disposed within cylinder bore 15, and adapted for reciprocal movement therein, is an annular piston 17 which is flanged at the forward end thereof as at 18, said flange having disposed near the periphery thereof a series of openings 19. A portion of piston 17 is in the form of a sleeve 20 which is flanged at the end thereof as at 21. A resilient cup-shaped seal 22 is disposed forwardly of flange 21 and secured to sleeve 20 for preventing leakage of fluid from the system. An elongated rod 23, suitably associated with the foot pedal 13 by means (not shown) and being lodged within a bore formed by the sleeve 20 internally of piston 17, is adapted to operate the piston 17 upon any exertion of pressure by the operator. A snap-ring 24 is partially embedded in casting 14 and forms a stop for the retracted position of piston 17. An extensible boot 25 may, at one end thereof, be secured to the casting 14, as by cement, by means of a metallic ring 26, bonded or otherwise secured thereto, for cooperating with any action of the foot pedal and for confining rod 23 within a closed space.

A resilient cup-shaped seal 27 is disposed forwardly of flange 18 of piston 17, and has provided therewithin a metal cup-shaped member 28 against which one end of a spring 29 is adapted to rest for securing member 27 in place and for assisting in the retraction of piston 17 after the braking action has been completed. The other end of spring 29 is adapted to rest against the rim or flared portion of a two-way check valve, generally indicated at 30, and being of the type which is widely used at present in hydraulic braking systems.

Valve 30 consists of an inverted cup-shaped metal dome 31 which is provided with an unpliant rim. This rim has an underlying annular rib 32 which engages and seats into a corresponding recess 33 disposed in a thick rubber gasket 34; engagement between member 31 and gasket 34 is assisted by means of spring 29 resting against same. Secured to the upper portion of the inside of dome 31, and shaped correspondingly thereto, is a resilient member 35. Although member 35 is tightly fitted into the cup area of member 31, fluid may pass between the adjacent sides thereof after passing through an opening 36 provided in member 31. On the other hand, fluid attempting to pass in the opposite direction must do so by passing between the adjacent sides of rib 32 of member 31 and recess 33 of gasket 34. A further discussion of valve 30 is not deemed necessary because same is commonly known to the industry, and it is thought that a mere general disclosure thereof, in as much as this type of valve is used only incidentally herein, is sufficient.

Booster 11 comprises a body casting 40 formed at one end thereof to provide a threaded neck portion 41 for engagement with a threaded bore disposed at the end of bore 15 of body casting 14. These two threaded elements, in assembly, are adapted to preserve the continuity of bore 15, both in casting 14 and in casting 40, by providing in the latter a bore 42 at the forward end thereof. A gasket 43 is provided at the junction of castings 14 and 40 for sealing same. In direct communication with bores 15 and 42, and disposed internally of casting 40, is a spring and valve chamber 44 which houses a spring 45 and a spider 46 into the latter of which the stem of a valve 47 is adapted to be adjustably secured, preferably, as shown in Fig. 2, by means of a co-relation between respective threaded portions thereof. Valve 47 extends horizontally from spider 46 into and through an internal bore 48 of a piston 49 and is adapted always to be centrally located with respect to bore 48 by means of a guide 50, which is integral with the bore walls of piston 49 (as is indicated in Fig. 3). It will be noted that, in assembly, the spider 46 and the valve guide 50 combine to assist in maintaining perpendicularity between the axis of valve 47 and the plane of the seat for spider 46 so that, regardless of the conditions within the system and the effect of spring 45, there will be practically no binding of valve 47, and the system will operate in accordance with the design thereof.

Piston 49 is adapted to be disposed within an enlarged bore 51 of body casting 40 for slidable movement therein. The forward end of piston 49 has an internal bore which, in assembly, combines to associate itself with bore 44 of casting 40 and form a part thereof; this forward portion of piston 49 is provided with an outer threaded wall which is adapted to be engaged with by a threaded nut 52 which retains a thin washer 53 and a cup-shaped seal 54 against the enlarged forward wall of piston 49 and the wall of bore 51. It is obvious that the purpose of washer 53 is to provide a means for preventing frictional contact between nut 52 and seal 54, and for maintaining a seal between piston 49 and the central peripheral portion of seal 54. The other end of piston 49, namely, that portion which forms a seat for the under-portion of the head of valve 47, is provided with a threaded neck portion 55 for engagement therewith of a threaded nut 56 for retaining a thin washer 57 and a cup-shaped seal 58 against the rearward wall of piston 49 and the wall of a bore 59 disposed in a heavy metal cap 60 which is provided for closing the system. Cap 60 is flanged at 61 and fixedly secured to body casting 40 by means of a series of annularly disposed stud bolts 62 which pass through threaded openings in flange 61 and into threaded openings provided in casting 40.

Within casting 40 there is disposed an enlarged chamber 63 which is defined on one side by the enlarged flanged portion of piston 49, on the opposite side thereto by the inner wall of cap 60, on another side by casting 40, and on the side opposite thereto by piston 49. A spring 64 (the strength of which is sufficient to withstand the pressure necessary to move the brake shoes into their respective drums and to return piston 49 to its "at rest" position, when the braking action is completed, and thereby open valve 47) is disposed within chamber 63 and telescopes piston 49 at this point and tends to separate the enlarged portions of the inner walls of piston 49 and cap 60. It will be noted that spring 64 may be easily replaced without disturbing the rest of the booster by merely removing cap 60. It will be noted that seals 54 and 58, one sealing the forward wall of piston 49 and the other sealing the rearward wall thereof, prevent liquid from entering chamber 63; for this reason an air vent 65 is provided in the under portion of the wall of casting 40 and communicates at all times the chamber 63 with the outside atmosphere so that spring 64 will operate normally. Centrally disposed in the end portion of cap 60 is a threaded opening 66 by means of which the conduit or fluid line 12 may be connected to the booster 11, so as to transmit the pressure through the fluid contained within line 12 to the wheel brakes for operating same.

A bleeder screw 67 is provided to close the opening in casting 40 which communicates with chamber 44, and same may be removed at any time when it is necessary to bleed the system of any air which has inadvertently passed thereinto through one fault or another, or which exists at the time of initial set-up of the system.

A composition ring 68 may or may not be provided in the under-side of the head of valve 47 for giving a better seal between said valve and piston 49. Provision of such a ring, however, would seem advisable.

The operation of the preferred construction of the invention which is embodied in Fig. 2 is as follows:

Pressure applied by the operator on foot pedal 13 causes member 27 to move past the small opening in cylinder 10 which is in communication with cylinder 15 and react thereafter upon a system which is full of fluid. This pressure is transmitted through the opening 36 in the two-way check valve 70, and between the sides of members 31 and 35. The fluid is then forced between the arms of spider 46 into and through chambers 44 and 48, out from the latter into chamber 59 by passing between the head of valve 47 and the seat therefor, and thence into line 12, when it is finally transmitted to the wheel brakes. Added pressure is necessary to move the brake shoes firmly into their respective drums because of the springs on these shoes opposing this action, and, therefore, the operator is called upon to continue his efforts toward that end. After this additional pressure has been applied, that is, the amount required to lodge the shoes firmly into the drums, piston 49 "catches up" with valve 47 and from then on whatever pedal pressure is applied is effective against the large face of said piston. "Floating" no longer exists after piston 49 and valve 47 begin to move as a unit toward the discharge end of the booster; instead, the ratio of line pressure and pedal pressure becomes equal to the ratio of the areas of piston 49, the effect being that a small pedal pressure multiplies into a high brake shoe pressure. This effect, it will be seen, is concurrent with the firm engagement between shoe and drum, and is most advantageous, therefore. The advantages, in particular, will be found in the foregoing paragraphs, and the eighth object of the invention as set out at the beginning of this specification should be especially noted.

Referring now to Fig. 4, there is illustrated a modified form of the master cylinder-hydraulic booster combination illustrated in Fig. 2. This type of system is so designed and has its parts so arranged that the fluid is sealed within the system and not exposed to the atmosphere. In using the closed system, it is possible to use a hygroscopic fluid which usually has a lower freezing point or a higher boiling point than fluids of the non-hygroscopic type possess. Other advantages are obvious from the use of the closed system, one of the chief advantages being that loss by leakage of fluid from the system is reduced to a minimum.

In Fig. 4, the master cylinder construction, generally indicated at 110, comprises a body casting 111 formed internally thereof to provide a cylinder bore 112. Within bore 112, an annular piston 113 is adapted to reciprocate, a portion of said piston forming a sleeve 114 which extends into an enlarged chamber 115 formed in the body casting 111. A resilient cup-shaped seal 116 is disposed forwardly of piston 113, and a spring 117 is confined between the seal 116 and the end of cylinder bore 112 for the purpose of maintaining said seal in position and also to assist in retracting said piston. Seal 116 is adapted to seal piston 113 upon movement thereof and with respect to the cylinder bore 112 so that the fluid within the brake system ahead of said piston may be subjected to pressure.

Piston 113 is adapted to be operated by a rod 118 which sets within sleeve 114, and which rod is adapted to be operated by any conventional means, such as a foot-operated brake pedal 13 (see Fig. 1).

Chamber 115 is closed to the atmosphere by a flexible boot 119 which, at one end thereof, is adapted to be secured to sleeve 114, and at the other end thereof, is adapted to be secured to the body of casting 111. At one end thereof, boot 119 has suitably secured thereto, such as by bonding, a metallic reenforcing ring 120 which is adapted to be secured between a gasket 121 resting upon an annular shoulder 122 provided in body casting 111 and the peripheral flange on an annular cup-shaped metallic member 123 which surrounds boot 119, and which member 123 is secured in place by a nut 124 which is suitably secured in the threaded end of body casting 111. The opposite end of boot 119 is secured to sleeve 114 by means of a suitable cement and reenforcement thereof by means of a metallic ring 125. It will be seen that chamber 115 is thereby closed to the outside atmosphere so that there is no possibility of fluid leakage out from body casting 111 or chamber 115 unless flexible member 119 should become accidentally damaged.

Fig. 4 does not go as far as Fig. 2 in revealing the method of closing the rod-end of the system, but it is thought that disclosure of same in Fig. 2 will suffice, if more protection from exposure is desired.

In connection with the master cylinder, there is provided a compensator chamber 126 which is in free and direct communication with chamber 115, and which is also provided with a somewhat restricted communication with cylinder bore 112 ahead of piston 113 at such time as said piston is in its retracted position, by means of a relatively small opening 127 extending through the cylinder wall. As soon as seal 116 of piston 113 is moved past the opening 127, the space ahead of said seal is separated from chambers 126 and 115.

Chamber 126 is closed by a flexible wall 128 which is backed up by a spring-pressed plunger 129, a spring 130 being secured between plunger 129 and a heavy cap member 131 which is threadedly secured in a threaded opening provided in the body casting 111. Wall 128 extends completely across the opening in the body member of the casting and is secured in place by cap 131 which engages a reenforcing ring 132 to which said wall may be bonded, the connection between wall and casting being such as to insure a seal which will prevent the escape of fluid from chamber 126. Plunger 129 may be provided with a rod 133 extending through an opening in cap 131 so as to indicate the position of plunger 129 within chamber 126 whereby the quantity of fluid within the brake system may be outwardly determined.

When piston 113 is moved forwardly in the cylinder bore 112 for applying pressure to the fluid therein, said bore is cut off from communication with compensator chamber 126 and chamber 115. During the protractile movement of piston 113, the volume of chamber 115 is reduced and the fluid therein will be displaced into chamber 126 and against the force of spring-pressed plunger 129, the spring 130 being a relatively light spring. When piston 113 is in its retracted position and the system is at rest, plunger 129 operates to maintain the fluid in the system under a slight pressure. Chamber 126, in addition to providing a fluid reservoir, also acts as a compensating chamber to take care of the volumetric changes in the fluid of the system due to the changes in temperature caused by the heat of friction between the brake shoes and drums.

Body casting 111 is provided with an opening in communication with chamber 115, such opening being closed by a screw 134 which may be removed for bleeding air from the system during the initial set-up thereof.

Body casting 111 is so constructed as to have internally provided at one end thereof an enlarged chamber 140 in which an annular piston 141 is adapted to reciprocate. Rearwardly disposed with respect to piston 141, and fitted thereto for sealing same, is a cup-shaped resilient seal 142 which is held in place by means of a washer 143 backed up by a nut 144 screwed onto a threaded end of piston 141. This threaded end of piston 141 is adapted to cooperate with a dome-shaped annular stop 145 provided with a central opening 146 and a series of other than central openings 147, when the system is at rest. These openings 146 and 147 are, obviously, for the purpose of providing fluid and pressure communication between chamber 112 and those chambers ahead of stop 145 (with exception of chamber 140). Stop 145 is held rigidly in place against a shoulder provided therefor in casting 111 by means of a retaining snap-ring 148 which is partially embedded in casting 111.

Piston 141 is provided with a central bore 149 in which a spring-impressed valve 150 is adapted to reciprocate. The position of valve 150 with respect to its seat and also to stop 145 is adjustable by means of a nut and screw unit, generally indicated at 151, one end of which, under idle conditions, rests against stop 145, and the other end of which, under all conditions, is connected to an end of valve 150 with a guide member 152 interposed. Integral with the inner wall of bore 149 of piston 141 is a valve guide 153 (see Fig. 5) which tends to eliminate any angularity set up between the axes of valve 150 and bore 149 during operation of the mechanism. A spring 154 is confined, in telescopic relation with respect to valve 150, between guides 153 and 152, so that reciprocation of valve 150 is opposed, at least in one direction, thereby. The head of valve 150, in its under face, is provided with an annular recess into which is securely wedged a composition ring 155 which is adapted to cooperate with the valve seat formed by the forward end of piston 141 and afford a better seal thereby.

A heavy metal cap 156 is provided to close the booster-end of the master cylinder construction, and is secured to casting 111 by means of a series of peripherally disposed bolts 157 projecting through openings provided therefor in cap 156 and into threaded openings provided therefor in casting 111. A threaded opening 158 is provided in the end of cap 156 for connection thereto of an end of fluid line 12 (see Fig. 1) for transmission therethrough of the pressures set up in the system. Cap 156 is formed internally thereof to provide a chamber 159 into which is projected, for reciprocation therein, the forward and smaller end of piston 141. It will be seen that chambers 159 and 140 are of different areas, each having a correspondingly-sized portion of piston 141 disposed therewithin, and it is thought that a discussion of this feature is unnecessary, in view of the description of the operation of the preferred embodiment in Fig. 2 appearing above. A cup-shaped resilient seal 160 is disposed forwardly and secured to the smaller end of piston 141 for sealing same with respect to the inner wall of cap 156.

It will be noted that the construction embodied in Fig. 2 provided an air vent communicating the spring chamber of the booster with the outside atmosphere for purposes aforementioned, and that same feature might possibly be embodied in the construction disclosed in Fig. 4. However, inasmuch as the construction under discussion is one of the closed type, it has been thought advisable to carry same through to a finish. Therefore, chamber 140 in Fig. 4 has been provided with an opening 161 in direct communication with compensator chamber 126 by way of an elongated opening 162 in the lower portion of the booster-section of body casting 111. When the fluid pressure has risen in line 12 to such an extent that the brake shoes are firmly engaged in their respective drums, then and only then will piston 141 move forwardly against the force of spring 163 (this spring is similar in design, strength, and utility as is spring 64 in Fig. 2). This means that a certain amount of fluid in chamber 140 will necessarily have to be displaced because of the reduced volume of chamber 140 upon forward motion of piston 141. Opening 161 serves as the outlet therefor and could just as well have been an air vent similar to air vent 65 in Fig. 2 were it not for the fact that this construction has been designed as a closed type system, and for that reason chamber 140 has fluid disposed therein. But, since piston 141 has a very limited and minute movement, the displacement will be quite small and will require a pressure necessary only to overcome the force of spring 130 which is impressed upon plunger 129 of the compressor.

There is an opening provided in the upper portion of body casting 111 directly above chamber 140 which, when open, serves as a bleeding means for any air which is present in the system during the initial set-up thereof, but which is provided to be closed by means of a bleeder screw 164.

It will be seen that the design embodied in Fig. 4 has utilized a portion of the master cylinder casting for formation thereof of the booster cylinder, but it seems obvious, in view of Fig. 2 and the separate units embodied therein, that Fig. 4 could just as easily have been provided with similar separate units.

It does not seem necessary to repeat the discussion of the operation of the mechanism in Fig. 4 inasmuch as said mechanism operates quite similarly to that embodied in Fig. 2, and a detailed discussion of the operation of the mechanism in Fig. 2, as previously stated, appears above.

While the invention has been described with some detail, and has been accompanied by a modification thereof, it is to be understood that the description is for the purpose of illustration only and is not definitive of the limits of the inventive idea. The right is reserved to make such changes in the details of construction and arrangement of parts as will fall within the purview of the attached claims.

I claim:

1. In a system of hydraulic braking, a pair of body members removably joined together and in communication with each other, a pair of chambers one formed in each member, a pair of pistons one operable in each chamber, one of said pistons having opposite working faces of unequal cross-sections and an axial bore extending therebetween, and a valve supported in said bore and having a stem extending beyond said larger face and a head extending beyond said smaller face, said stem forming a guide for said valve, and said smaller face of said piston forming a seat for said head.

2. In a system of hydraulic braking, a pair of body members removably joined toether and in fluid communication with each other, a pair of chambers formed in each member, one of said pairs of chambers forming a working cylinder and a fluid supply therefor, the second of said pair of chambers forming a pair of coaxial cylinders, a double-faced piston adapted to reciprocate in said pair of cylinders having one face in each cylinder, an axial bore between the faces of said piston, a valve supported in said bore and having a stem extending between the faces of said piston, means forming a part of one of said cylinders for forming a guide and stop for said valve stem, and a spring associated with said cylinder for preventing said valve from closing until a predetermined pressure has been reached in said cylinders.

3. In a system of hydraulic braking, a pair of body members removably joined together in fluid communication with each other, a pair of chambers formed in each member, one of said pairs of chambers forming a working cylinder and a fluid supply therefor, the second of said pair of chambers forming a pair of coaxial cylinders of unequal diameter, a double-faced piston adapted to reciprocate in said pair of cylinders having one face in each cylinder, an axial bore between the faces of said piston, a valve seating against the smaller face of said piston supported in said bore and having a stem extending between the faces of said piston, means forming a part of one of said cylinders for forming a guide and stop for said valve stem, and a spring associated with said cylinder for preventing said valve from closing until a predetermined pressure has been reached in said cylinders.

GEORGE H. HUNT.